United States Patent
Cai et al.

(10) Patent No.: US 11,765,623 B1
(45) Date of Patent: Sep. 19, 2023

(54) SYSTEMS AND METHODS FOR DYNAMIC QUALITY OF SERVICE VIA RADIO INTELLIGENT CONTROLLER

(71) Applicant: T-Mobile Innovations LLC, Overland Park, KS (US)

(72) Inventors: Zheng Cai, Fairfax, VA (US); Durga Prasad Satapathy, Ashburn, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 50 days.

(21) Appl. No.: 17/317,588

(22) Filed: May 11, 2021

(51) Int. Cl.
*H04W 28/24* (2009.01)
*H04W 28/02* (2009.01)

(52) U.S. Cl.
CPC ....... *H04W 28/24* (2013.01); *H04W 28/0268* (2013.01)

(58) Field of Classification Search
CPC .............. H04W 28/24; H04W 28/0268; H04L 41/5009; H04L 41/5032; H04L 1/0017
See application file for complete search history.

(56) References Cited

U.S. PATENT DOCUMENTS

| 2016/0283275 A1* | 9/2016 | Li ........................ H04L 41/5051 |
| 2019/0116516 A1* | 4/2019 | Raleigh ............... H04W 12/088 |
| 2020/0383154 A1* | 12/2020 | Chauhan ................ H04W 76/14 |
| 2022/0256394 A1* | 8/2022 | Briggs .................. H04W 76/12 |

* cited by examiner

*Primary Examiner* — Omer S Mian
(74) *Attorney, Agent, or Firm* — SHOOK, HARDY & BACON L.L.P.

(57) ABSTRACT

Systems, methods, and devices are described for dynamic modifications of quality of service (QoS) rules in a communication network. Modification of the QoS rules can initiated by user equipment connected to an access point or an application server associated with an user equipment executed application. The modification can alter the communication priority of data communicated to, or communicated from, the user equipment. Additionally, or alternatively, the modification can alter the minimum data throughput for data communicated to, or communicated from, the user equipment.

20 Claims, 4 Drawing Sheets

SYSTEMS AND METHODS FOR DYNAMIC QUALITY OF SERVICE VIA RADIO INTELLIGENT CONTROLLER

CROSS-REFERENCE TO RELATED APPLICATIONS

Not applicable.

TECHNICAL FIELD

Aspects hereof relate to devices, systems, and methods for dynamically modifying quality of service parameters in radio wave based communications networks.

BRIEF SUMMARY

A high-level overview of various aspects of the technology described herein is provided as an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

Telecommunications networks can allocate network resources to each connected device based on predetermined quality of service (QoS) rules. These QoS rules commonly dictate the transmission priorities and minimum throughput for the devices connected to the radio access network. For an illustrative example, in time-division based telecommunication networks the QoS rules may define the minimum number of time blocks a particular device can be allocated, the minimum number of channels a particular device can be allocated, or both. Similarly, in frequency-division based telecommunication networks the QoS rules may define the minimum number of frequency bands a particular device can be allocated. Traditionally, a telecommunications network's QoS rules are unilaterally defined and enforced by the network's core component infrastructure. However, the proliferation of 5G enabled devices and networks has facilitated a rapid growth in device and application features that consume a comparatively high level of network resources. For example, 4K streaming video platforms, mobile gaming, and automatic cloud backup features may be detrimentally impacted by high latency, reduced data throughput, or both. Accordingly, the present disclosure is directed, in part, to dynamically modifying QoS rules for a device connected to a telecommunication network.

For example, some aspects of the present disclosure are directed to methods, systems, and process of described herein can facilitate user equipment triggered modifications of QoS rules. Some aspects comprise detecting a radio frequency signal broadcast by a user equipment comprising a request to establish a communication link with the remote device and establishing the communication link with the user equipment using a set of predefined service properties for the user equipment in response to detection of the radio frequency signal. An indication that a quality of service upgrade request that identifies the user equipment is detected. For example, the quality of service upgrade request can be generated by the user equipment, another user equipment, or an application server. In response to the indication that the quality of service upgrade request, at least one service rule of a set of predefined service rules governing the established communication link is modified. For example, the modification can include assigning data communications associated with the user equipment a higher priority than defined by the predetermined service rules. Additionally, or alternatively, the modification can increase the minimum number of time blocks assigned to the user equipment, the minimum number of frequency blocks assigned to the user equipment, or any combination thereof. The communication link with the user equipment can be altered in response to the modification.

Additionally, or alternatively, some aspects described herein comprise a radio controller having a service layer connection to an access point. The radio controller is associated with a non-transitory storage medium storing instructions that when executed by at least one processor associated with the radio controller cause the at least one processor to perform a method, the method comprising monitoring data communications between a remote device and a base station. Responsive to detection of data communication from the remote device that includes a communication property upgrade request, transmitting an upgrade request identifying the remote device to the access point.

BRIEF DESCRIPTION OF THE DRAWINGS

Illustrative embodiments of the present invention are described in detail below with reference to the attached drawing figures, and wherein.

DETAILED DESCRIPTION

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| AMF | Access & Mobility Management Function |
| CPF | Control Plane Function |
| CU | Centralized Unit |
| DU | Distributed Unit |
| eNodeB | Evolved Node B |
| gNodeB | Next Generation Node B |
| LTE | Long Term Evolution |
| MIMO | Multiple Input Multiple Output |
| PCF | Policy Control Function |
| PDU | Protocol Data Unit |
| R/N | Relay Node |
| RAN | Radio Access Network |
| RF | Radio-Frequency |
| RFI | Radio-Frequency Interference |
| RIC | RAN Intelligent Controller |
| SMF | Session Management Function |
| UE | User Equipment |
| UPF | User Plane Function |

Further, various technical terms are used throughout this description. An illustrative resource that fleshes out various aspects of these terms can be found in Newton's Telecom Dictionary, 25th Edition (2009).

Figure 1:
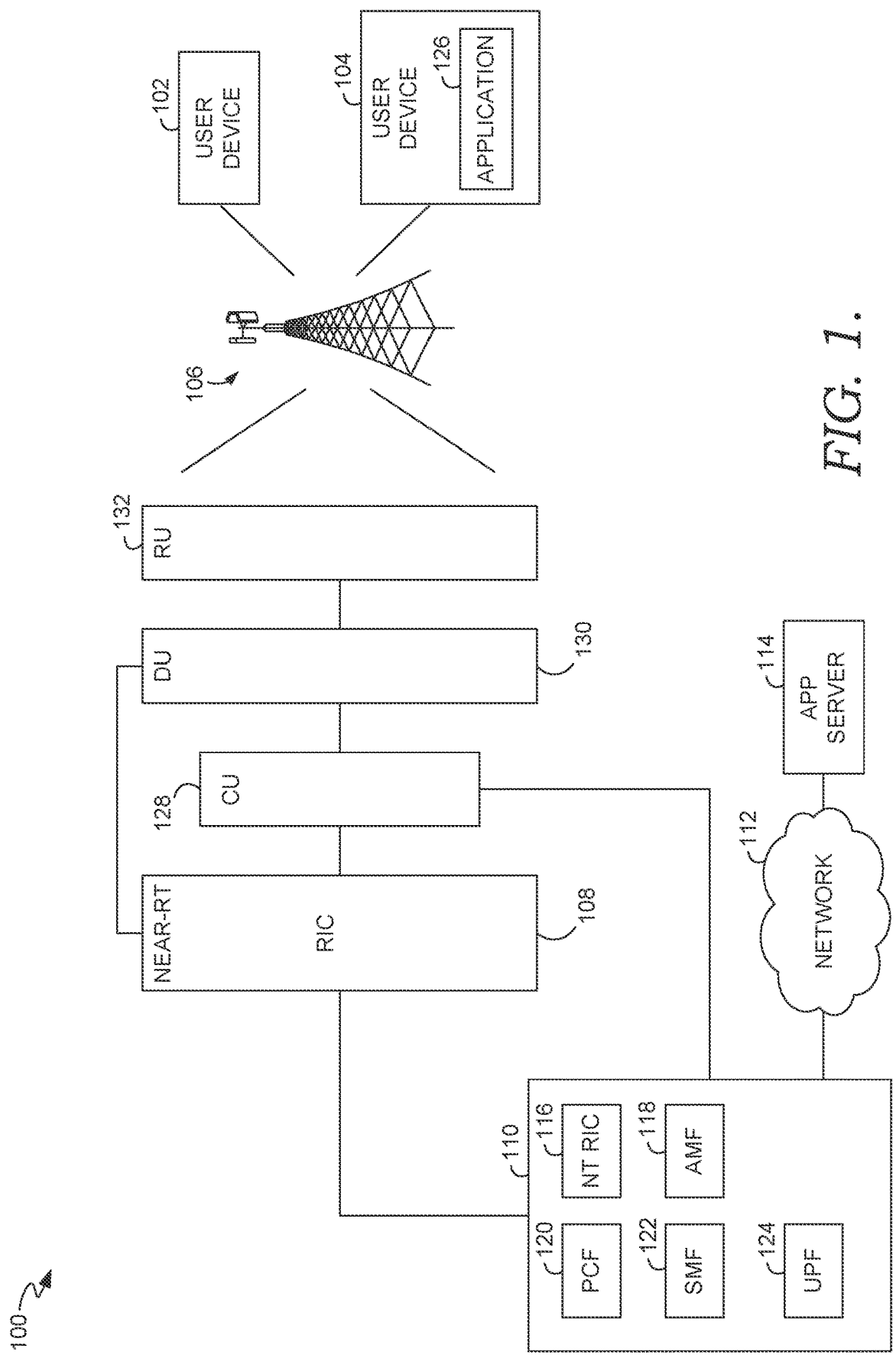
FIG. 1 depicts an example wireless communications network, according to an aspect herein.

Referring to FIG. 1, a network environment suitable for use in implementing embodiments of the present disclosure is provided. Such a network environment as illustrated in FIG. 1 is designated generally as network environment 100. Network environment 100 is but one example of a suitable network environment and is not intended to suggest any limitation as to the scope of use or functionality of the disclosure. Neither should network environment 100 be interpreted as having any dependency or requirement relating to any one or combination of components illustrated. However, as depicted, network environment 100 includes user equipment 102,104, access point 106, core 110, network 112, and application server 114.

In network environment 100, user equipment (UE) (also referred to herein as a user device) 102 and 104 can take on a variety of forms, such as a personal computer (PC), a smart phone, a smart watch, a laptop computer, a mobile phone, a mobile device, a tablet computer, a wearable computer, a personal digital assistant (PDA), a server, a global positioning system (GPS) device, any combination of these delineated devices, or any other device (such as the UE 400 of FIG. 4) that communicates via wireless communications with the access point 106 in order to interact with a public or private network. Additionally, or alternatively, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. In this regard, the user device can be any mobile computing device that communicates by way of a wireless network, for example, a 1× circuit voice, a 3G network (e.g., CDMA, CDMA2000, WCDMA, GSM, UMTS), a 4G network (WiMAX, LTE, HSDPA), a 5G network, or any other type of network.

Some aspects of UE 104 include application layer operations that facilitate application 126. Generally, application 126 communicates with application server 114 to facilitate the services enabled by application 126. For example, application 126 can communicate data that facilitates a multi-player game, a streaming video service, or a picture or video distribution or storage service hosted by application server 114. Additionally, application 126 monitors service layer operations of UE 104. For example, application 126 collects QoS parameters from UE 104 that represent the current properties of communications between UE 104 and application server 114 including the communication link between the access point 106 and UE 104. In some aspects, a QoS parameter comprises a measure of latency, a measure of data throughput, or both. Additionally, some aspects of application 126 include application desired QoS parameters. For example, a desired QoS parameter can be a maximum latency, a minimum data throughput, or both.

Generally, access point 106 is configured to communicate with user devices, such as user equipment 102 and 104 that are located within the geographical area, or cell, covered by a RF wave generated radio antennas of access point 106. Access point 106 comprises at least one antenna array having at least one antenna. Example antennas include a dipole, monopole, loop, parabolic, traveling-wave, aperture, yagi-uda, conical spiral, helical, conical, radomes, horn, any combination thereof, or the like. The antenna array of an access point can operate in networks such as 3G, 4G, 5G, and 802.11n, and utilize techniques such as MIMO, MU-MIMO, FD-MIMO, massive MIMO, beamforming, or any combination thereof. In one aspect, the antenna may be configured to communicate in the UHF, SHF spectrum, or a combination thereof; for example, in the range of 1.3 GHz-30 GHz. In some aspects, access point 106 comprises a wireless communications station that is installed at a fixed location (e.g., a telecommunication tower) or a mobile access point (e.g., small cell).

Some embodiments of access point 106 includes hardware, firmware, software, or any combination thereof that facilitate radio communication with one or more UEs using the radio antennas. For example, access point 106 can include a CU 128, which provides support for the higher layers of the protocol stack such as the radio resource control (RRC) protocol and packet data convergence protocol (PDCP). Access point 106 can also include a DU 130, which provides support for the lower layers of the protocol stack such the data link (e.g., MAC) layer and Physical layer. Additionally, an access point 106 can include a radio unit (RU) 132, which facilitates functions such as analog to digital conversion, filtering, and power amplification. Some aspects of access point 106 include an eNodeB or a gNodeB.

Near Real-Time (RT) RIC 108 includes hardware, firmware, software, or any combination thereof that facilitate communication between access points (e.g., access point 106), UEs (e.g., UE 102,104), and the network core 110. Some aspects of Near-RT RIC 108 comprise micro-service-based applications that provide near real-time infrastructural control of the connected access points. In this context, near real-time is used in relation to tasks that require less than or equal to 1 second response. Near-RT RIC 108 monitors the network traffic of access point 106 and optimizes network resource utilization based on the network traffic. In some aspects, optimization of network resource utilization includes UE load-balancing, interference detection and mitigation, connectivity management, and hangover control.

Network core 110 includes hardware, firmware, software, or any combination thereof that facilitate communication between access points (e.g., access point 106), UEs (e.g., UE 102,104), and a network (e.g., network 112). For example, network core 110 includes a user plane function (UPF) module 124 that maintains PDU sessions, packet routing and packet forwarding, packet inspection, policy enforcement for the user plane. Some aspects of network core 110 also include an SMF module 122 that can facilitate initial creation of PDU sessions using predetermined session establishment procedures. Some aspects of network core 110 also include an access and mobility management function (AMF) module 118 that facilitates mobility management, registration management, and connection management. Some aspects, of AMF module 118 maintains a UE lookup table that stores UE identifiers (e.g., MAC addresses) for UE's that connect to an access point. Some aspects of network core 110 also includes a policy control function (PCF) module 120 that maintains and applies policy control decisions and subscription information. In some aspects, the PCF module 120 maintains a policy database that stores QoS policy rules. For example, a QoS policy rule can identify a predetermined resource allocation algorithm that is implemented during the initial communication link setup (e.g., the rules that are applied when a UE first connects to an access point). The policy database can also include any number of additional policy rules.

Network core 110 also includes a Non Real-Time (Non-RT) radio access network intelligent controller (RIC) 116.

Non-RT RIC 116 generally facilitates configuration management and performance management operations of the communications network. For example, Non-RT RIC 116 can collect network resource allocation data (e.g., the number of resource blocks available, the number of resource blocks currently used, the broadcast modes available, the broadcast mode currently used, the make and model of the access points components, any other network performance data, or any combination thereof) from the Near-RT RIC 108 for access point 106. Some aspects of Non-RT RIC 116 can use the network resource allocation data to model the performance of the communications network for a UE. Additionally, Non-RT RIC 116 can model expected performance under variable network resource allocation rules. Said another way, Non-RT RIC 116 models the performance of the access point and each UE (e.g., UE 102 and UE 104) connected to the access point as the QoS rules enforced for a particular UE (e.g., UE 104) are changed. The output of the modeled performance based on a set QoS rules of can be compared to a desired QoS parameter. Where the modeled performance is equal to or better than the desired QoS parameter the network core 110 determines that the set of QoS rules satisfies the desired QoS parameter. Some aspects of network core 110 store QoS rules that satisfy a desired QoS parameter.

Network 112 generally facilitates communication between the UEs 102,104 and application server 114. As such, network 112 can include access points, routers, switches, or other commonly understood network components that provide wired or wireless network connectivity. In other words, Network 112 may include multiple networks, or a network of networks, but is depicted in a simple form so as not to obscure aspects of the present disclosure. By way of example, network 112 can include one or more wide area networks (WANs), one or more local area networks (LANs), one or more public networks, such as the Internet, one or more private networks, one or more telecommunications networks, or any combination thereof. Where network 112 includes a wireless telecommunications network, components such as a base station, a communications tower, or even access points (as well as other components) may provide wireless connectivity. Networking environments are commonplace in enterprise-wide computer networks, intranets, and the Internet. Accordingly, network 112 is not described in significant detail herein.

Application server 114 generally facilitates hosting services, data, or both for an application executed by a UE (e.g., UE 104). For example, an application server can host a multiplayer game, a streaming video service, or a picture or video distribution or storage service. In other words, an aspect of application server 114 includes a web server for hosting a website accessible by any of the UEs 102,104. Additionally or alternatively, an aspect of application server 114 includes a data server supporting an application executed by a UE. The hosted website or data server can support any type of website or application, including those that facilitate gaming; media upload, download, streaming, distribution, or storage. Additionally, some aspects of application server 114 monitors QoS parameters associated with the communication link between UE 104 and application server 114 including the communication link between the access point 106 and UE 104. In some aspects, a QoS parameter comprises a measure of latency, a measure of data throughput, or both. Additionally, some aspects of application server 114 include a record of desired QoS parameters. For example, a desired QoS parameter can be a maximum latency, a minimum data throughput, or both.

Figure 2:
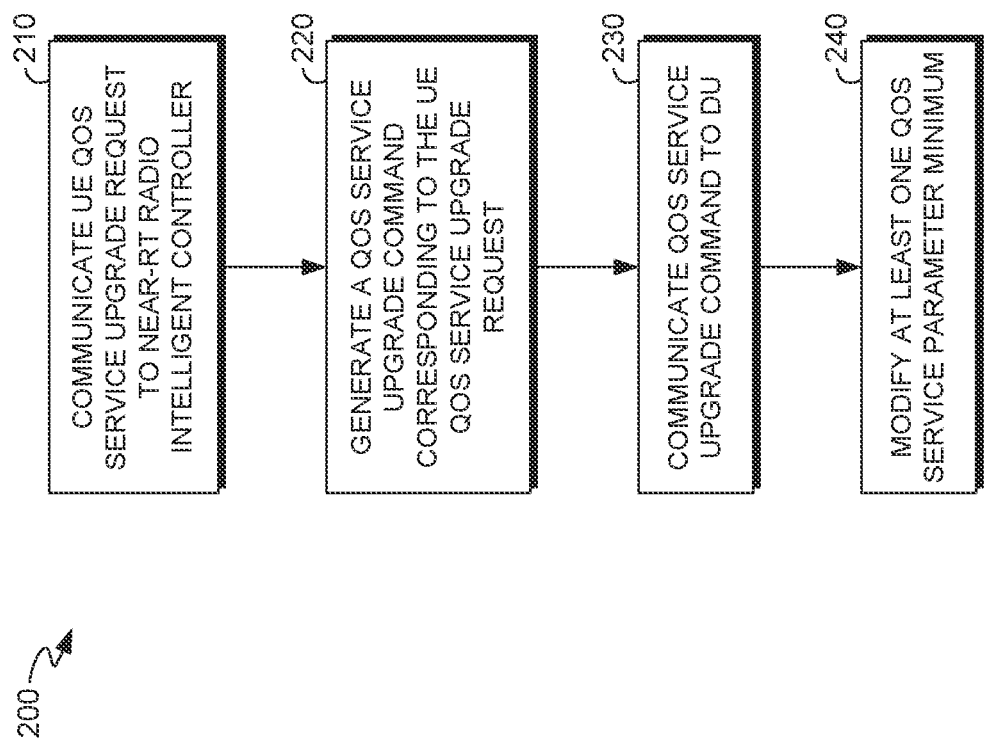
FIG. 2 depicts an example method for dynamically modifying quality of service (QoS) rules, according to aspects described herein.

Turning to FIG. 2, and with continued reference to FIG. 1, a method 200 for dynamically adjusting QoS for a connected user equipment is provided in accordance with aspects disclosed herein. Some aspects of method 200 can be implemented by components of network environment 100. For example, some aspects of method 200 can facilitate adjusting QoS rules based on a QoS upgrade requests communicated by a UE (e.g., UE 104).

Some aspects of method 200 includes detecting a radio signal broadcast by a UE that includes a request to establish a communication link with a remote device. The request can include data that identifies the particular UE (e.g., distinguishes UE 104 from UE 102) to the network. For example, the data can include a UE ID such as the UE's media access control (MAC) address or any other identifier suitable to distinguish a particular UE from a plurality of UEs.

Some aspects of method 200 includes establishing a communication link between a UE and an access point. The initially established communication link includes a PDU session governed by a predetermined set of QoS rules. The predetermined set of QoS rules can include rules that dictate the priority of data packets. In other words, the predetermined set of QoS rules can include rules that dictate the order in which data packets of different types (e.g., voice communication data, service data, application data, and so forth) are communicated to a UE. For example, the predetermined QoS rules may place the highest (first) priority to voice communication data. The predetermined QoS rules may place the second highest (second) priority to service data. The predetermined QoS rules may place the third highest (third) priority to application data. Additionally, or alternatively, the predetermined set of QoS rules include rules that dictate data throughput for the communication link between the UE and the access point. For example, the predetermined QoS rules can define a minimum throughput for UE's connected to the access point.

The predetermined QoS rules can be stored as a default set of rules maintained by a database connected to one or more components of a Near-RT RIC (e.g., Near-RT RIC 108). In an aspect, in response to detecting the request to establish a communication link with a UE, the access point (e.g., access point 106) requests the predetermine QoS rules from the Near-RT RIC. The Near-RT RIC accesses the database and communicates the predetermined QoS rules to the access point. The access point applies the predetermined QoS rules for the communication link with the UE.

At step 210, method 200 includes communicating a UE QoS service upgrade request to a Near-RT RIC. In some aspects, the UE QoS service upgrade request is generated by a UE (e.g., UE 104). For example, the application can monitor the QoS parameters for the UE based on data transmitted from the UE to the application server. Additionally, or alternatively, the application executed in the application layer of UE 104 can request the QoS rules currently enforced on the communication link for UE 104. The application can compare the currently enforced QoS rules (e.g., the predetermined QoS rules) to a desired set of QoS rules. For example, an application that facilitates uploading photographs, video, or live streaming video may have a desired set of QoS rules that increase the minimum data throughput available to the UE 104. For another example, an application that facilitates a multiplayer game may have a desired set of QoS rules that decreases the maximum latency between the UE and the server hosting the application (e.g., application server 114). Based on the comparison, the application generates a request to upgrade the QoS rules for the UE in an aspect. Alternatively, the application presents the user with an option to request a QoS upgrade.

In some aspects of step 210, the UE QoS service upgrade request is generated by the application server (e.g., application server 114). For example, the application server can request the QoS rules currently enforced on the communication link for UE 104. The application server can compare the currently enforced QoS rules (e.g., the predetermined QoS rules) to a desired set of QoS rules. For example, the application server may have a desired set of QoS rules that increase the minimum data throughput available to UE 104. For another example, the application server may have a desired set of QoS rules that decreases the maximum latency between the UE 104 and the application server 114. Based on the comparison, the application server 114 generates a request to upgrade the QoS rules for UE 104 in an aspect. Alternatively, the application server communicates instructions to UE 104 to present the user with an option to request a QoS upgrade.

The UE QoS service upgrade request includes a UE identifier and a requested QoS. The UE ID can include the UE's media access control (MAC) address or any other identifier suitable to distinguish a particular UE from a plurality of UEs. In some aspects, the requested QoS comprises one or more identifiers that represent a set of QoS rules maintained by Near-RT RIC 108. In some aspects, the requested QoS comprises an indication of the maximum latency, the minimum throughput, or a combination of both. In some aspects, the UE QoS service upgrade request also includes a radio bearer identification or any other data.

In response to detecting a QoS upgrade request a Near-RT RIC can query a database for QoS rules that correspond to the requested QoS, in some aspects. For example, the Near-RT RIC can query the database for a record that corresponds to the one or more identifiers included in the QoS request. For another example, the Near-RT RIC can query the database for a record that includes QoS rules that are equal to or exceed the requested QoS. In other words, the Near-RT RIC can query the database for a record that includes QoS rules that facilitate a maximum latency that is equal to or less than the maximum latency included in the QoS upgrade request. For example, the QoS rules may assign data communications between an application server (e.g., application server 114) and the UE (e.g., UE 104) a higher priority than assigned in the predetermined QoS rules. Similarly, the Near-RT RIC can query the database for an entry that includes QoS rules that facilitate a minimum throughput that is equal to or greater than the minimum throughput included in the QoS upgrade request.

At step 220, method 200 generates a QoS upgrade command corresponding to the UE QoS service upgrade request. Said another way, the Near-RT RIC generates instructions that include a command to modify the QoS rules enforced for the communication link between the access point (e.g., access point 106) and the UE associated with the QoS upgrade request (e.g., UE 104). The QoS upgrade command can be generated by an application executed by a Near-RT RIC based on the current UE load, beam pattern, channel load, layer load, broadcast mode, or any other parameter for the access point facilitating communication with the particular UE. At step 230, QoS service upgrade command is communicated to the access point maintaining the communication link to the UE corresponding to the upgrade request. For example, the Near-RT RIC 108 can transmit the command to a DU of the access point 106 via a direct communication interface, such as an E2 interface. In an aspect, the command causes the DU to increase the throughput by increasing the time slots allocated to the UE or frequency resource blocks in the scheduler.

At step 240, at least one QoS parameter is modified for the UE associated with the QoS upgrade command. In some aspects, the QoS service parameter is modified by applying a QoS rule that assigns a larger minimum data throughput for the UE (e.g., UE 104). For example, the access point (e.g., access point 106) can modify the minimum number of time blocks assigned to the UE, the minimum number of frequency blocks assigned to the UE, or any combination thereof. In some aspects, the access point can modify the minimum number of time blocks assigned to the UE for data communicated to an application server (e.g., application server 114), the minimum number of frequency blocks assigned to the UE for data communicated to an application server, or any combination thereof. Similarly, in some aspects the QoS service parameter is modified to assign a higher priority to data communicated to the UE associated with the QoS upgrade command.

Some aspects of method 200 also facilitate automatically restoring the predetermined QoS rules in response to a predetermined network trigger. The predetermined network trigger can vary based on the particular communication network that is implementing method 200. In an aspect, the predetermined network trigger can be a duration of time, an amount of data, or termination of the communication link between the UE and an access point. For example, some aspects of method 200 include, monitoring a duration of the altered communication link between UE 104 and access point 106. In response to a determination that the duration of the altered communication link is at least equal to a predetermined period of time (e.g., 1 hour, 12 hours, 24 hours, or any other duration of time) the Near-RT RIC modifies the QoS rules governing the communication link with UE 104 to the predetermined QoS rules. Although described in relation to enhancing a UE's QoS rules (e.g., increasing the minimum data throughput, decreasing the maximum latency, or a combination of both), one skilled in the art will understand that some aspects of method 200 can facilitate a request from a UE to dynamically decrease the UE's QoS rules (e.g., decreasing the minimum data throughput, increasing the maximum latency, or a combination of both).

Figure 3:
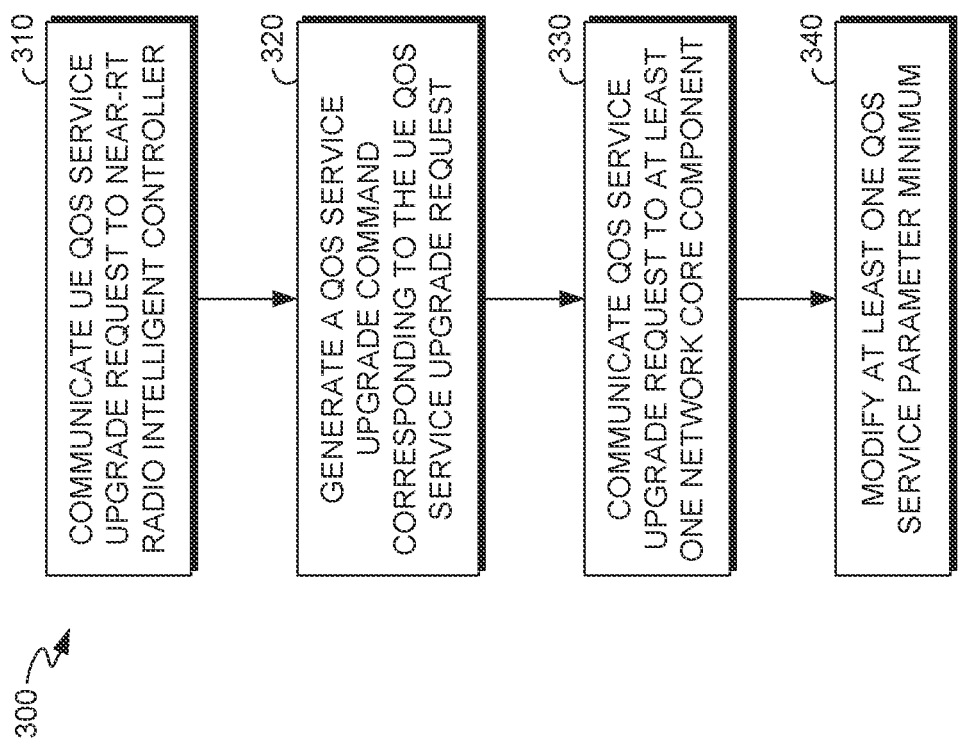
FIG. 3 depicts another example method for dynamically modifying QoS rules, according to aspects described herein.

Turning to FIG. 3, and with continued reference to FIG. 1, a method 300 for dynamically adjusting QoS for a connected user equipment is provided in accordance with aspects disclosed herein. In some embodiments, method 300 can be used for QoS switching in response to an automatic or manual QoS upgrade request associated with a UE currently communicating with access point 106.

At step 310, a UE QoS service upgrade request is communicated to a Near-RT RIC. The UE QoS service upgrade request generally identifies the particular UE (e.g., UE 104) connected to an access point (e.g., access point 106) and identifies the desired set of QoS rules for the particular UE. A UE QoS service upgrade request can be generated by, or otherwise communicated from, the UE that will also receive the QoS upgrade (e.g., UE 104), a UE other than the UE that will receive the QoS upgrade, or an application server (e.g., application server 114). For example, an application executed in the application layer of UE 104 or UE 102 can detect the QoS rules currently enforced on the communication link for UE 104. The application can compare the currently enforced QoS rules (e.g., the predetermined QoS rules) to a desired set of QoS rules. The desired set of QoS rules can vary based on the application, communication network, service associated with the application, or the UE. For example, an application that facilitates uploading photographs, video, or live streaming video may have a desired set of QoS rules that increase the minimum data throughput available to the UE. An application that facilitates a multi-player game may have a desired set of QoS rules that decreases the maximum latency between the UE and the server hosting the application. Based on the comparison, the application generates a request to upgrade the QoS rules for the UE in an aspect.

The UE QoS service upgrade request includes a UE identifier and a requested QoS. The UE ID can include the UE's media access control (MAC) address or any other identifier suitable to distinguish a particular UE from a plurality of UEs. In some aspects, the requested QoS comprises one or more identifiers that represent a set of QoS rules maintained by the communication network. In some aspects, the requested QoS comprises an indication of the desired QoS parameter. For example, the requested QoS can comprise a maximum latency, a minimum throughput, or a combination of both. In some aspects, the UE QoS service upgrade request also includes a radio bearer identification or any other data.

At step 320, the QoS upgrade request is provisionally authorized. The QoS upgrade request can be provisionally authorized by an application executed by a Near-RT RIC based on the current UE load for the access point facilitating communication with the particular UE. For example, the Near-RT RIC can evaluate network utilization parameters (e.g., resource blocks) for the access point. Where the network utilization parameters are below a predetermined network utilization threshold the Near-RT RIC can provisionally authorize the QoS upgrade request corresponding to the particular UE (e.g., UE 104).

At step 330, the provisionally authorized QoS service upgrade request is communicated to the network core (e.g., network core 110). The network core can evaluate the current allocation of network resources (e.g., current UE load, beam pattern, channel load, layer load, broadcast mode, or any other parameter for the access point facilitating communication with the particular UE) and model the expected network performance based on the current allocation. The network core modifies the modeled allocation of network resources based on the QoS upgrade request. For example, the network core may increase the minimum throughput assigned to the particular UE in the model and analyze performance the modified network resource allocations. If the modeled resource allocation produces less data throughput than included in the QoS upgrade request, the network core again increases the minimum throughput assigned to the UE and remodels the expected network performance. Where the modeled resource allocation results in throughput that is equal to or greater than the requested throughput, the network core generates a QoS upgrade command that reflects the modified allocation of network resources. Similarly, the network core can model increases to the minimum priority assigned to data communicated to the particular UE. Additionally, or alternatively, the network core may analyze the QoS service upgrade request and query a database for previously defined or previously modeled QoS rules that correspond to the requested QoS.

At step 340, at least one QoS service parameter is modified for the QoS rules corresponding to the UE associated with the QoS upgrade request. In some aspects, the QoS service parameter is modified based on the parameters determined during the network core's expected performance modeling. For example, the network core can command the access point to increase the minimum throughput. Similarly, in some aspects the network core commands the access point to assign a higher priority to data communicated to the UE.

Some aspects of method 300 also facilitate automatically restoring the predetermined QoS rules in response to a predetermined network trigger. The predetermined network trigger can vary based on the particular communication network. In an aspect, the predetermined network trigger can be a duration of time, an amount of data, or termination of the communication link between the UE and an access point. For example, some aspects of method 300 include, monitoring a duration of the altered communication link between UE 104 and access point 106. In response to a determination that the duration of the altered communication link is at least equal to a predetermined period of time (e.g., 1 hour, 12 hours, 24 hours, or any other duration of time) the Non-RT RIC modifies the QoS rules governing the communication link with UE 104 to the predetermined QoS rules.

Figure 4:
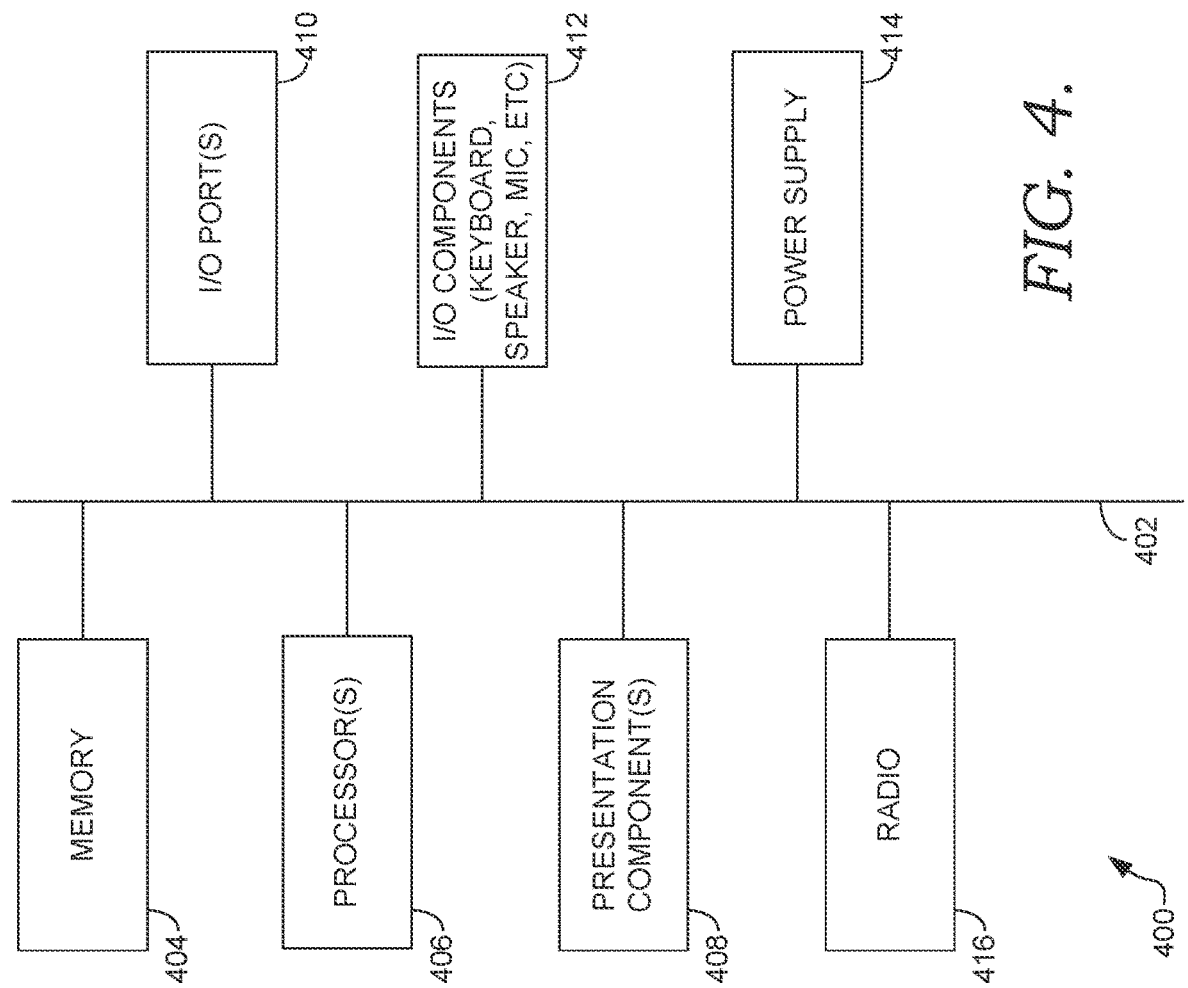
FIG. 4 depicts a block diagram of an example computing device suitable for use in implementing embodiments herein.

With reference to FIG. 4, UE 400 includes a bus 402 that directly or indirectly couples the following devices: memory 404, one or more processors 406, one or more presentation components 408, input/output (I/O) ports 410, input/output components 412, and an illustrative power supply 414. Bus 402 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an example computing device that can be used in connection with one or more embodiments of the present invention. Distinction is not made between such categories as "workstation," "server," "laptop," "handheld device," etc., as all are contemplated within the scope of FIG. 4 and reference to "computing device."

UE 400 typically includes a variety of computer-readable media. Computer-readable media can be any available media that can be accessed by UE 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by UE 400. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 404 includes computer-storage media in the form of volatile and/or nonvolatile memory. The memory may be removable, non-removable, or a combination thereof. Example hardware devices include solid-state memory, hard drives, optical-disc drives, etc. UE 400 includes one or more processors that read data from various entities such as memory 404 or I/O components 412. Presentation component(s) 408 present data indications to a user or other device. Example presentation components include a display device, speaker, printing component, vibrating component, etc.

I/O ports 410 allow UE 400 to be logically coupled to other devices including I/O components 412, some of which may be built in. Illustrative components include a microphone, joystick, game pad, satellite dish, scanner, printer, wireless device, etc.

Radio 416 represents a radio that facilitates communication with a wireless telecommunications network. Illustrative wireless telecommunications technologies include CDMA, GPRS, TDMA, GSM, and the like. Radio 416 might additionally or alternatively facilitate other types of wireless communications including Wi-Fi, WiMAX, LTE, 5G, or other VoIP communications. As can be appreciated, in various embodiments, radio 416 can be configured to support multiple technologies and/or multiple radios can be utilized to support multiple technologies.

The subject matter of the technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

The invention claimed is:

1. A method of dynamic radio frequency communication prioritization comprising:
   detecting a radio frequency signal broadcast by a remote device, the radio frequency signal broadcast comprising a request to establish a communication link with the remote device;
   responsive to detection of the radio frequency signal broadcast, establishing the communication link with the remote device using a set of predefined service properties for the remote device;
   responsive to a request from the remote device, communicating with an application server across a network to establish a data link;
   facilitating bi-directional communication between the remote device and the application server with the data link and communication link;
   responsive to establishing the data link, communicating to the application server, the set of predefined service properties used for the communication link with the remote device;
   receiving a communication property upgrade request from the application server generated by the application server based on the communicated set of predefined service properties or at least one service property of the set of predefined service properties;
   detecting that the communication property upgrade request includes a device identifier that distinguishes the remote device from a plurality of other remote devices; and
   responsive to the device identifier within the communication property upgrade request, modifying at least one service property of the set of predefined service properties governing the communication link established with the remote device.

2. The method of claim 1, further comprising:
   monitoring a duration of the modified communication link; and
   responsive to determining the duration of the modified communication link is at least equal to a predetermined period of time, modifying the at least one service property governing the communication link to the predefined service properties.

3. The method of claim 1, wherein modifying the at least one service property alters minimum priority of data communicated to the remote device via the communication link.

4. The method of claim 1, wherein modifying the at least one service property alters a minimum throughput of data communicated to the remote device via the communication link.

5. The method of claim 4, wherein the minimum throughput is altered by increasing a minimum time block or frequency block assigned to the remote device.

6. The method of claim 1, wherein the indication that the communication property upgrade request is communicated by the remote device while the communication link is using the set of predefined service properties for the remote device.

7. A dynamic radio communication system comprising:
   a radio controller having a service layer connection to an access point;
   a non-transitory storage medium storing instructions that when executed by at least one processor associated with the radio controller cause the at least one processor to perform a method, the method comprising:
   monitoring data communications between a remote device and the access point via an established communication link;
   determining a desired quality of service of the established communications link and a corresponding set of rules, which set at least one service property governing the established communication link between the access point and the remote device; and
   maintaining the desired quality of service by adjusting the at least one service property governing the established communication link between the access point and the remote device based on a set of rules, the maintaining of the desired quality of service comprises:
   responsive to detection of data communicated from the remote device that includes a service property upgrade request with a device identifier that distinguishes the remote device from a plurality of other remote devices, and transmitting an upgrade command identifying the remote device to the access point, wherein the upgrade command modifies the at least one service property governing the established communication link between the access point and the remote device.

8. The dynamic radio communication system of 7, further comprising:
   monitoring a duration of the modified communication link; and responsive to determining the modified of the modified established communication link is at least equal to a predetermined period of time, modifying the at least one service property governing the established communication link to a predefined setting.

9. The dynamic radio communication system of 7, wherein modifying the at least one service property alters minimum priority of data communicated to the remote device via the established communication link.

10. The dynamic radio communication system of 7, wherein modifying the at least one service property alters minimum throughput of data communicated to the remote device via the established communication link.

11. The dynamic radio communication system of 7, wherein the upgrade request is communicated by the remote device while the established communication link is using a predefined service for the remote device.

12. The dynamic radio communication system of 7, wherein the service property upgrade request comprises a device identifier and a quality of service identifier.

13. Non-transitory storage medium storing instructions that when executed by at least one processor associated with a radio controller cause the at least one processor to perform a method comprising:
   detecting a radio frequency signal broadcast by a remote device comprising a request to establish a communication link with the remote device;
   responsive to detection of the radio frequency signal broadcast, establishing the communication link with the remote device using a set of predefined service properties for the remote device;
   responsive to a request from the remote device, communicating with an application server across a network to establish a data link;
   facilitating bi-directional communication between the remote device and the application server with the data link and communication link;
   responsive to establishing the data link, communicating to the application server the set of predefined service properties used for the communication link with the remote device;
   receiving a communication property upgrade request from the application server generated by the application server based on the communicated set of predefined service properties or at least one service property of the set of predefined service properties;
   detecting that the communication property upgrade request includes a device identifier that distinguishes the remote device from a plurality of other remote devices has been received; and
   responsive to device identifier within the communication property upgrade request, modifying the at least one service property of the set of predefined service properties governing the communication link established with the remote device.

14. The non-transitory storage medium of claim 13, wherein the method further comprises:
   monitoring a duration of the modified communication link; and
   responsive to determining the duration of the modified communication link is at least equal to a predetermined period of time, modifying the at least one service property governing the communication link to the predefined service properties.

15. The non-transitory storage medium of claim 13, wherein modifying the at least one service property alters minimum priority of data communicated to the remote device via the communication link.

16. The non-transitory storage medium of claim 13, wherein modifying the at least one service property alters minimum throughput of data communicated to the remote device via the communication link.

17. The non-transitory storage medium of claim 16, wherein the minimum throughput is altered by increasing a minimum time block or frequency block assigned to the remote device.

18. The non-transitory storage medium of claim 13, wherein the indication that the communication property upgrade request is communicated by the remote device while the communication link is using the set of predefined service properties for the remote device.

19. The non-transitory storage medium of claim 13, wherein the communication property upgrade request comprises a device identifier and a quality of service identifier.

20. The method of claim 1, wherein monitoring a parameter of a least one service property of the set of predefined service properties governing the communication link established with the remote device and communicating the parameter to the application server.

* * * * *